United States Patent
Ono et al.

(10) Patent No.: US 12,358,081 B2
(45) Date of Patent: Jul. 15, 2025

(54) POSITION DETECTION APPARATUS FOR SEAM PORTION AND HEATING PORTION OF WELDED STEEL PIPE, MANUFACTURING EQUIPMENT FOR WELDED STEEL PIPE, POSITION DETECTION METHOD FOR SEAM PORTION AND HEATING PORTION OF WELDED STEEL PIPE, MANUFACTURING METHOD FOR WELDED STEEL PIPE, AND QUALITY CONTROL METHOD FOR WELDED STEEL PIPE

(71) Applicant: JFE STEEL CORPORATION, Tokyo (JP)

(72) Inventors: Hiroaki Ono, Tokyo (JP); Shuichi Sato, Tokyo (JP); Mitsutoshi Kemmochi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/037,178

(22) PCT Filed: Sep. 8, 2021

(86) PCT No.: PCT/JP2021/033008
§ 371 (c)(1),
(2) Date: May 16, 2023

(87) PCT Pub. No.: WO2022/118515
PCT Pub. Date: Jun. 9, 2022

(65) Prior Publication Data
US 2024/0017358 A1    Jan. 18, 2024

(30) Foreign Application Priority Data
Dec. 3, 2020  (JP) .................................. 2020-201226

(51) Int. Cl.
*B23K 31/02*   (2006.01)
*B21C 37/08*   (2006.01)
(Continued)

(52) U.S. Cl.
CPC ........ *B23K 31/027* (2013.01); *B21C 37/0811* (2013.01); *B23K 31/125* (2013.01); *B23K 2101/06* (2018.08); *B23K 2103/04* (2018.08)

(58) Field of Classification Search
CPC ................ B23K 31/027; B23K 31/125; B23K 2101/06; B23K 2103/04; B23K 2101/10;
(Continued)

(56) References Cited

U.S. PATENT DOCUMENTS

2012/0285936 A1\* 11/2012 Urashima .......... G01B 9/02091
                                                   219/121.63
2016/0193681 A1\*  7/2016 Pesme ................. B23K 9/1274
                                                   219/136

(Continued)

FOREIGN PATENT DOCUMENTS

CA   3123741 A1 \*  6/2020   ........... B23K 26/032
CA   3127631 A1 \*  8/2020   ........... B01D 1/0017

(Continued)

OTHER PUBLICATIONS

Apr. 1, 12, 2024 extended Search Report issued in European Patent Application No. 21900271.4.
(Continued)

*Primary Examiner* — Kiley S Stoner
(74) *Attorney, Agent, or Firm* — Oliff PLC

(57) ABSTRACT

A position detection apparatus for a seam portion and a heating portion of a welded steel pipe, the position detection apparatus includes: a light source configured to irradiate the seam portion and the heating portion with light in a first wavelength range; an imaging unit having a plurality of
(Continued)

different channels and configured to capture an image of each of the seam portion and the heating portion irradiated with the light by the light source; and an image processing unit configured to process the image captured by the imaging unit and to detect the position of each of the seam portion and the heating portion, wherein the imaging unit includes: a first channel capable of receiving the light in the first wavelength range; and a second channel capable of receiving light in a second wavelength range corresponding to radiation light from the heating portion.

10 Claims, 10 Drawing Sheets

(51) Int. Cl.
 *B23K 31/12* (2006.01)
 *B23K 101/06* (2006.01)
 *B23K 103/04* (2006.01)

(58) Field of Classification Search
 CPC . B21C 37/0811; B21C 37/0807; B21C 51/00; B21C 37/08; C21D 8/105; C21D 2261/00; C21D 1/26; C21D 9/08; C21D 9/50; B23D 79/021; G01B 11/03
 USPC .......................................... 228/8–12, 102–105
 See application file for complete search history.

(56) References Cited

U.S. PATENT DOCUMENTS

| | | | | |
|---|---|---|---|---|
| 2016/0350902 | A1* | 12/2016 | Hasegawa | B21C 37/08 |
| 2019/0039318 | A1* | 2/2019 | Madigan | B23K 15/02 |
| 2019/0126399 | A1* | 5/2019 | Urashima | B23K 31/125 |
| 2019/0255654 | A1* | 8/2019 | Beckett | B23K 26/0643 |
| 2019/0358690 | A1 | 11/2019 | Yin et al. | |
| 2021/0114136 | A1* | 4/2021 | Luedi | B23K 31/125 |
| 2022/0410323 | A1* | 12/2022 | Hanada | B25J 9/1679 |

FOREIGN PATENT DOCUMENTS

| | | | | | |
|---|---|---|---|---|---|
| CN | 103930233 | B | * | 8/2015 | ............ B21C 37/08 |
| CN | 109778115 | A | * | 5/2019 | ............... B21B 1/22 |
| CN | 111093887 | A | * | 5/2020 | .......... B23K 26/032 |
| CN | 111347157 | A | * | 6/2020 | .......... B23K 26/032 |
| CN | 111971143 | A | * | 11/2020 | .......... B23K 26/032 |
| CN | 112091480 | A | * | 12/2020 | ............ B23K 37/00 |
| CN | 112936686 | A | * | 6/2021 | ......... B21C 37/0807 |
| DE | 19852302 | A1 | * | 5/2000 | .......... B23K 26/032 |
| DE | 102007000981 | A1 | * | 8/2008 | ............. G01B 11/03 |
| DE | 102013218421 | A1 | * | 4/2015 | .......... B23K 26/032 |
| EP | 1238744 | A1 | * | 9/2002 | ............. B23K 26/03 |
| EP | 2796858 | A1 | * | 10/2014 | .......... B23K 31/125 |
| EP | 2886239 | A1 | * | 6/2015 | .......... B23K 26/032 |
| JP | S52-025687 | A | | 2/1977 | |
| JP | S56-033542 | A | | 4/1981 | |
| JP | S59-108903 | A | | 6/1984 | |
| JP | S62-042004 | A | | 2/1987 | |
| JP | H05-240844 | A | | 9/1993 | |
| JP | H10-170228 | A | | 6/1998 | |
| JP | H10-193155 | A | | 7/1998 | |
| JP | 2006234781 | A | * | 9/2006 | |
| JP | 2007120985 | A | * | 5/2007 | |
| JP | WO2019142350 | A1 | * | 1/2020 | |
| JP | 2021137867 | A | * | 9/2021 | ............. B23K 26/03 |
| WO | WO-0029166 | A1 | * | 5/2000 | .......... B23K 26/032 |
| WO | WO-2014155188 | A1 | * | 10/2014 | ............. B23K 26/03 |
| WO | WO-2015007322 | A1 | * | 1/2015 | .......... B23K 26/032 |
| WO | 2018/092461 | A1 | | 5/2018 | |
| WO | WO-2019159659 | A1 | * | 8/2019 | .......... B23K 26/032 |
| WO | WO-2019159660 | A1 | * | 8/2019 | .......... B23K 26/032 |
| WO | WO-2020127123 | A1 | * | 6/2020 | .......... B23K 26/032 |
| WO | WO-2022181061 | A1 | * | 9/2022 | ............. B23K 26/00 |

OTHER PUBLICATIONS

Nov. 2, 2021 International Search Report issued in International Patent Application No. PCT/JP2021/033008.
Nov. 2, 2021 Written Opinion of the International Searching Authority issued in International Patent Application No. PCT/JP2021/033008.
Dec. 9, 2024 Office Action issued in European Patent Application No. 21900271.4.

* cited by examiner

POSITION DETECTION APPARATUS FOR SEAM PORTION AND HEATING PORTION OF WELDED STEEL PIPE, MANUFACTURING EQUIPMENT FOR WELDED STEEL PIPE, POSITION DETECTION METHOD FOR SEAM PORTION AND HEATING PORTION OF WELDED STEEL PIPE, MANUFACTURING METHOD FOR WELDED STEEL PIPE, AND QUALITY CONTROL METHOD FOR WELDED STEEL PIPE

FIELD

The present invention relates to a position detection apparatus for a seam portion and a heating portion of a welded steel pipe, a manufacturing equipment for the welded steel pipe, a position detection method for the seam portion and the heating portion of the welded steel pipe, a manufacturing method for the welded steel pipe, and a quality control method for the welded steel pipe.

BACKGROUND

In a manufacturing line of a welded steel pipe (for example, an electric resistance welded pipe) in a steel process, a steel plate having a plate shape is pressed, and both ends of the steel plate are butted and welded at an upper portion, thereby manufacturing the welded steel pipe. At this time, the steel plate serving as a base material has material characteristics that satisfy required specifications because material quality such as controlling a temperature history is performed in the manufacturing process. However, since the base material is heated up to a temperature at which iron is melted in the welded portion, crystal grains become coarse and material characteristics deteriorate.

Therefore, for example, as illustrated in FIG. 1, steel plates serving as base materials are connected in parallel and welded by a welding apparatus 11, and then a shape defective portion (hereinafter, referred to as a "bead portion") formed on the surface is cut by a cutting apparatus 12. Thereafter, material characteristics of a seam portion are improved by performing annealing in which the cut welded portion is heated again.

Annealing is often performed over a plurality of times by induction heating, and it is important to accurately align and heat only the seam portion without affecting the base material by a heating device (annealing heater). However, since pass line fluctuations or twists of the welded steel pipe occur, currently, an operator visually observes the running state of the welded steel pipe and the deviation of the seam portion and the heating portion from time to time, and manually performs alignment as appropriate.

Here, in the present specification, the seam portion refers to a portion at which the base plate is joined by welding, that is, a welded portion. In the heating step (annealing step), it is ideal to perform heating so that the center of the range to be heated coincides with the seam portion. On the other hand, it is difficult to identify the seam portion by appearance. Therefore, normally, a cut portion where gloss is higher than that of the surrounding base material portion by the cutting of the bead portion is regarded as a seam portion, and an operator (worker) visually confirms whether the position of the seam portion coincides with the position of the heating portion, that is, the annealing heater to perform an operation.

However, in this case, problems such as loss of gloss due to adhesion of an oxide film to the seam portion by heating, difficulty in visual recognition because the seam portion serves as the heating portion and emits red heat light, and severity for an operator to constantly stare at the surface emitting red heat light occur. In addition, in order to accurately monitor the seam portion, it is necessary to approach an operating line in process of performing conveyance or temporarily stop the operating line. However, the former has a problem in safety, and the latter has a problem in that efficiency is reduced.

In order to solve these problems, various position detection methods for a seam portion of a welded steel pipe by an electromagnetic method, a marking method, an image method, and an optical method have been proposed in the related art. First, the electromagnetic method is a method of directly detecting the position of the seam portion. In the electromagnetic method, for example, as disclosed in Patent Literature 1, a difference between materials of a seam portion and a material portion is detected by an eddy current sensor, a leakage magnetic flux sensor, or the like. In addition, many methods of detecting a cut portion as a seam have also been proposed.

In the marking method, for example, as disclosed in Patent Literature 2, at a line position where the position of the seam portion is known immediately after welding of the welded steel pipe, marking with paint or the like is performed on the circumferential pipe surface having a known geometric relationship with the position of the seam portion, such as the side surface of the welded steel pipe. Then, at a place where it is desired to grasp the position of the seam portion in the downstream step, the position of the seam portion at the line position is detected by reading the circumferential position of a marker using, for example, an industrial television (ITV) or a light receiving element.

In the image method, for example, as disclosed in Patent Literature 3, a difference in gloss between the seam portion and the material portion is detected by an image detection unit such as a CCD camera. In addition, as the optical method, a method using a scattering phenomenon of laser light has been proposed. In this method, the position of the seam portion is detected using the fact that directionality of fine unevenness of the object surface appears as a difference in the two-dimensional distribution of reflected light due to equivalence of the light source wavefront of the laser.

Patent Literature 4 proposes a method of distinguishing between the seam portion and the material portion by utilizing a property that a substantially isotropic reflection pattern is generated in the material portion of the welded steel pipe, but the reflection pattern spreads in a transverse direction at the seam portion due to a cutting mark substantially parallel to a pipe axial direction remaining in the seam portion. In addition, in order to solve the problem of Patent Literature 4, Patent Literature 5 proposes a method of limiting a wavelength and an incident angle of laser light and accurately performing seam position detection by laser scattering. In addition, Patent Literature 6 proposes a method of calculating the maximum signal width by repeating threshold processing in horizontal and vertical directions from a reflection pattern image and detecting the position of the seam portion (cut portion).

CITATION LIST

Patent Literature

Patent Literature 1: JP S56-33542 A
Patent Literature 2: JP H05-240844 A

Patent Literature 3: JP H10-170228 A
Patent Literature 4: JP S52-25687 A
Patent Literature 5: JP S59-108903 A
Patent Literature 6: JP S62-42004 A

SUMMARY

Technical Problem

The technique proposed in Patent Literature 1 detects a phenomenon in which a difference in magnetic permeability or electrical conductivity due to a difference in structure such as a crystal grain size appears as a difference in magnetic flux distribution. Therefore, there is a problem in that the technique is likely to be affected by streaky non-uniformity of the shape of the surface, such as scratches on the pipe surface, and it is difficult to detect the position of the seam portion when a material is made uniform by annealing. Furthermore, since the magnetic permeability and the electrical conductivity significantly change depending on the temperature, there is also a problem in that when a temperature distribution occurs in the circumferential direction of the pipe as in the case of the welded steel pipe after annealing, the temperature distribution becomes a disturbance.

In the marking method proposed in Patent Literature 2, if there is a step of reheating the welded steel pipe such as annealing of the seam portion, a marking paint may be peeled off, and the reliability of detection may be lowered. In addition, when there is a positional deviation between the orientation of a marking device or a reading device such as an ITV and the central axis of a pipe, there is a problem in that the positional deviation directly leads to a detection error.

Furthermore, the methods proposed in the related art also have a problem in position detection accuracy of the seam portion. For example, in the image method proposed in Patent Literature 3, there is a problem in that it is difficult to detect the seam portion due to addition of a disturbance caused by red heat of an object that becomes high temperature after annealing.

In addition, the methods proposed in Patent Literatures 4 to 6 are all optical methods, and are configured to calculate the relative position of the seam position with respect to the heating device using reflection by a laser, an image, and shape measurement. However, it is known that the welded steel pipe gently fluctuates by about several millimeters in the width direction of the heating device. In this case, pass line fluctuation amounts at the positions of the detection device and the annealing heater are not necessarily the same, and even if the positional relationship of the seam portion is accurately calculated with respect to the detection device, there is a problem in that deviation from the heating position of the seam portion occurs.

In addition, a reflection pattern of laser light in the vicinity of the seam portion of the welded steel pipe is easily affected by the oxide film present on the surface depending on the incident angle, but in the method proposed in Patent Literature 4, a suitable range related to a wavelength of laser light, incident light, and reflected light is not defined. In addition, in the method proposed in Patent Literature 4, identification of the cut portion and the base material portion is determined based on presence or absence of reflected light detection by a pair of light receiving elements disposed at the opposite ends in the width direction of the light receiving surface. However, depending on an oxide film, a scratch, or the like that may occur around a seam portion of an actual welded steel pipe, even when a scattering pattern occurs, there is a problem in that light receiving intensity becomes weak and the position of the seam portion cannot be appropriately detected.

In addition, in the method proposed in Patent Literature 5, the wavelength and the incident angle of the laser beam are limited, but a specific calculation method of a feature amount of a reflection pattern image for specifying the seam portion is not clarified. Therefore, there is a problem in that the seam portion cannot be automatically detected as it is.

In addition, in the method proposed in Patent Literature 6, there are many parameters to be set in the process of image processing, such as an experimental formula for proper scanning line selection and a parameter of threshold processing of obtaining the maximum amplitude width before obtaining the maximum signal width. However, these parameters vary depending on the material, the standard of the steel pipe, and the like. Therefore, not only the operation is complicated, but also there is a problem in that a long-term accuracy test is required in order to acquire an appropriate setting parameter, or appropriate detection cannot be performed in a case where a scattering pattern has directionality in the oblique direction of an image.

In addition, since the methods proposed in Patent Literatures 4 to 6 are methods all using a reflection pattern of laser light, a large-scale equipment is required, and there is a problem in terms of cost and maintenance.

The present invention has been made in view of the above-described circumstances, and an object of the present invention is to provide a position detection apparatus for a seam portion and a heating portion of a welded steel pipe, a manufacturing equipment for the welded steel pipe, a position detection method for the seam portion and the heating portion of the welded steel pipe, a manufacturing method for the welded steel pipe, and a quality control method for the welded steel pipe capable of accurately detecting the positions of the seam portion and the heating portion of the welded steel pipe in a manufacturing step of the welded steel pipe.

Solution to Problem

To solve the problem and achieve the object, a position detection apparatus for a seam portion and a heating portion of a welded steel pipe, according to the present invention, is the position detection apparatus detecting a position of the seam portion of the welded steel pipe and a position of the heating portion generated by heating the seam portion and/or a vicinity of the seam portion. The position detection apparatus includes: a light source configured to irradiate the seam portion and the heating portion with light in a first wavelength range; an imaging unit having a plurality of different channels and configured to capture an image of each of the seam portion and the heating portion irradiated with the light by the light source; and an image processing unit configured to process the image captured by the imaging unit and to detect the position of each of the seam portion and the heating portion, wherein the imaging unit includes: a first channel capable of receiving the light in the first wavelength range; and a second channel capable of receiving light in a second wavelength range corresponding to radiation light from the heating portion.

Moreover, in the position detection apparatus for the seam portion and the heating portion of the welded steel pipe according to the present invention, the light source and the imaging unit having the first channel are disposed at positions satisfying a specular reflection condition with respect to a measurement point including the seam portion.

Moreover, a manufacturing equipment for a welded steel pipe, according to the present invention, is the manufacturing equipment that includes: a welding apparatus configured to weld a butt portion of a steel plate formed into a cylindrical shape; a cutting apparatus configured to cut a bead portion after welding; one or a plurality of annealing heaters configured to heat a seam portion after cutting; and the position detection apparatus for the seam portion and the heating portion of the welded steel pipe according to the present invention, the position detection apparatus being provided behind any one of the annealing heaters, wherein the position detection apparatus detects a position of the seam portion and a position of the heating portion generated by the annealing heater.

Moreover, a position detection method for a seam portion and a heating portion of a welded steel pipe, according to the present invention, is the position detection method detecting a position of the seam portion of the welded steel pipe and a position of the heating portion generated by heating the seam portion and/or a vicinity of the seam portion. The method includes: an irradiation step of irradiating the seam portion and the heating portion with light in a first wavelength range; an imaging step of capturing, by an imaging unit having a plurality of different channels, an image of each of the seam portion and the heating portion irradiated with the light; and an image processing step of processing the image captured by the imaging step and detecting the position of each of the seam portion and the heating portion, wherein the imaging unit includes: a first channel capable of receiving the light in the first wavelength range; and a second channel capable of receiving light in a second wavelength range corresponding to radiation light from the heating portion.

Moreover, a manufacturing method for a welded steel pipe, according to the present invention, is the manufacturing method that includes: a welding step of welding a butt portion of a steel plate formed into a cylindrical shape; a cutting step of cutting a bead portion after welding; and a heating step of heating a seam portion after cutting with an annealing heater, wherein the heating step includes a position detection step of detecting a position of the seam portion and a position of a heating portion generated by the annealing heater, by the position detection method for the seam portion and the heating portion of the welded steel pipe according to the present invention.

Moreover, in the manufacturing method for the welded steel pipe, according to the present invention, the heating step includes a heater position control step of controlling a position of the annealing heater based on a deviation amount of the position of the heating portion with respect to the position of the seam portion detected in the position detection step.

Moreover, a quality control method for a welded steel pipe, according to the present invention, is the quality control method controlling quality of the welded steel pipe based on a deviation amount of the position of the heating portion with respect to the position of the seam portion, the deviation amount being detected by the position detection method for the seam portion and the heating portion of the welded steel pipe according to the present invention.

Advantageous Effects of Invention

In the present invention, an image of a welded steel pipe is captured by an imaging unit including a channel configured to receive reflected light of light emitted from a light source to a seam portion and a channel configured to receive radiation light due to red heat of a heating portion. As a result, according to the present invention, a low-cost and simple configuration can be obtained, and the positions of the seam portion and the heating portion can be accurately detected.

Figure 8:
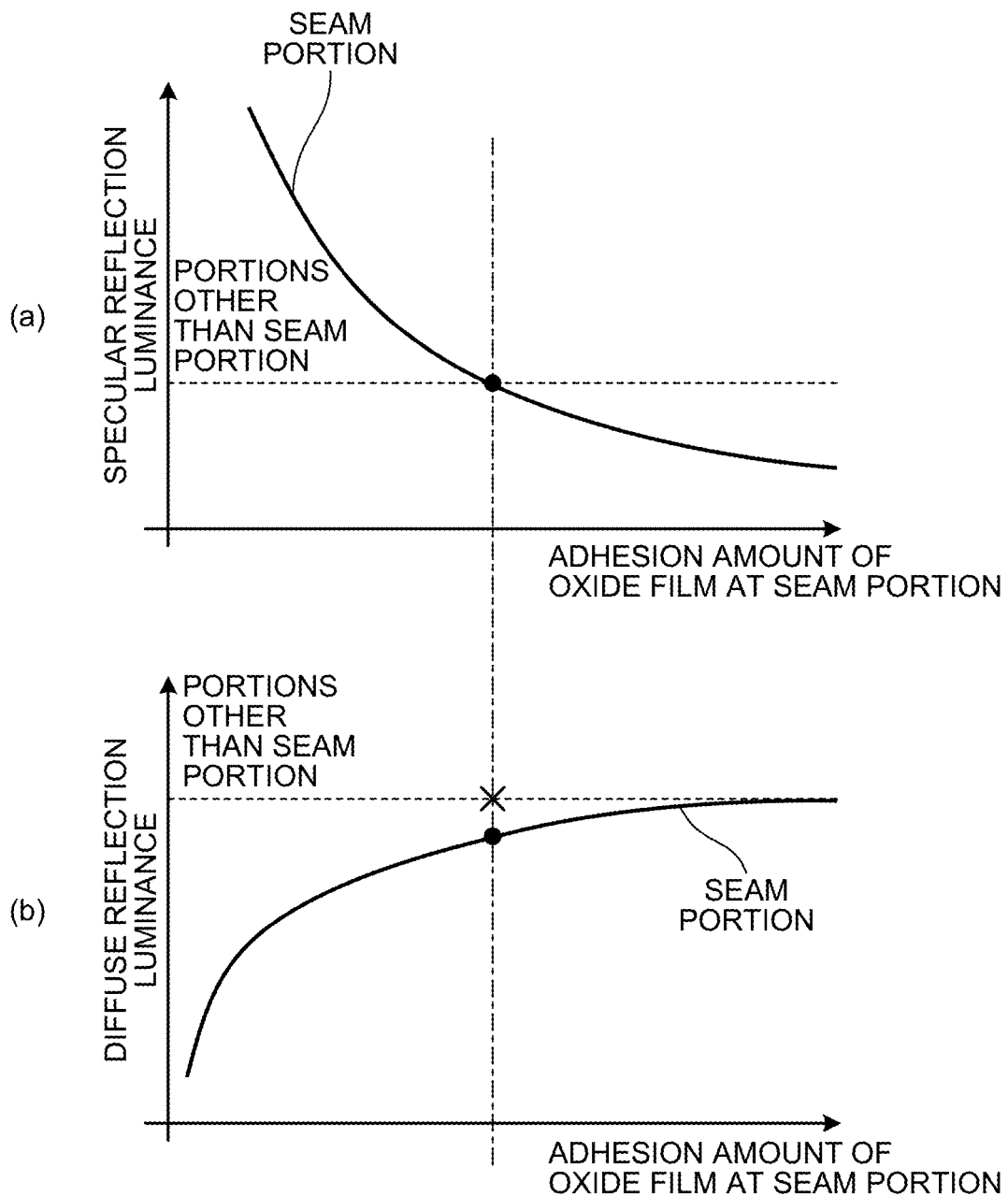

(a) of FIG. 8 is a diagram illustrating a relationship between an adhesion amount of an oxide film and specular reflection luminance at a seam portion and portions other than the seam portion, and (b) of FIG. 8 is a diagram illustrating a relationship between an adhesion amount of an oxide film and diffuse reflection luminance at a seam portion and portions other than the seam portion.

Figure 9:
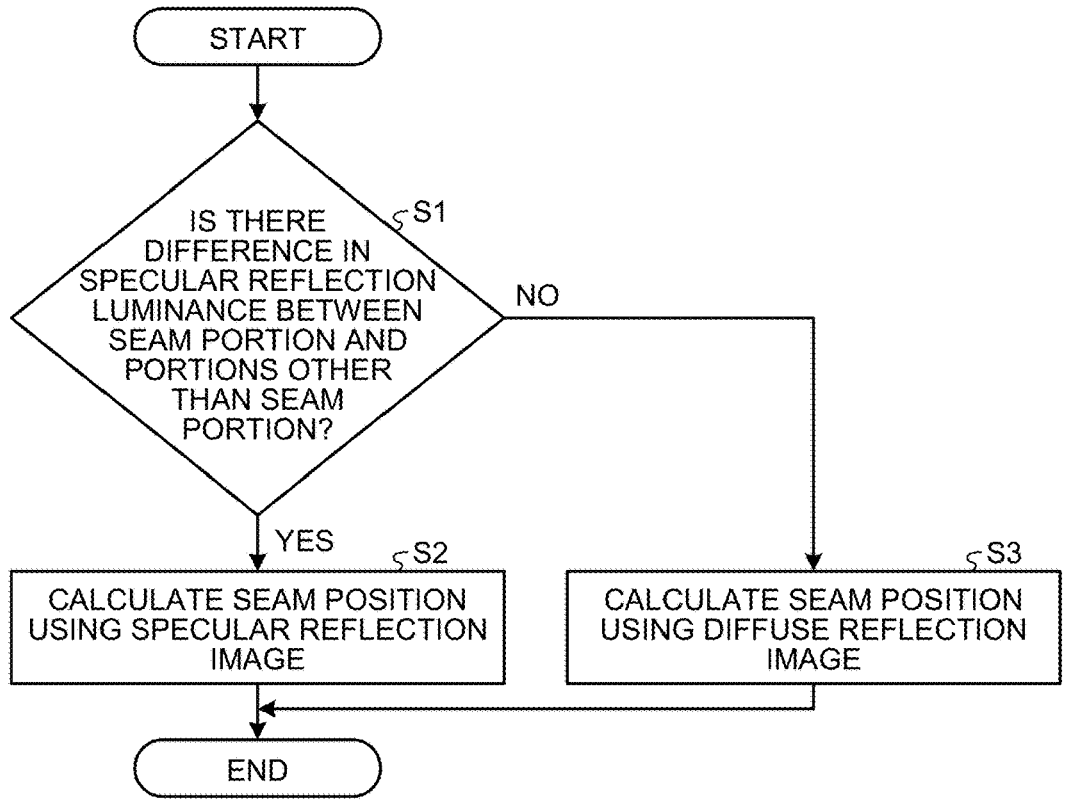

FIG. 9 is a diagram illustrating an example of a flowchart for detecting the position of a seam portion S by combining specular reflection information and diffuse reflection information.

Figure 10:
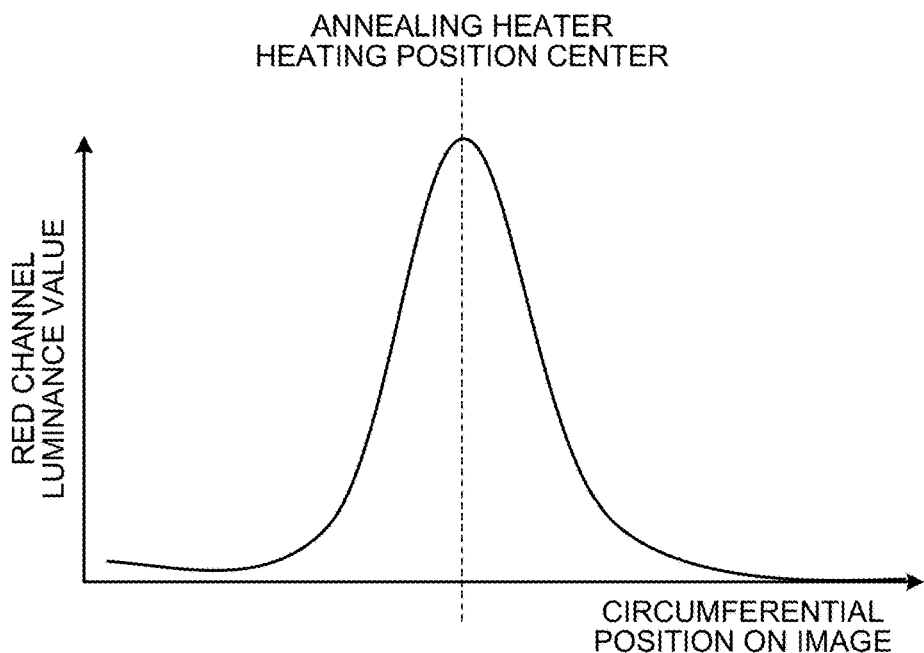

FIG. 10 is a diagram illustrating an example of a luminance profile obtained in a red channel of an imaging unit.

Figure 11:
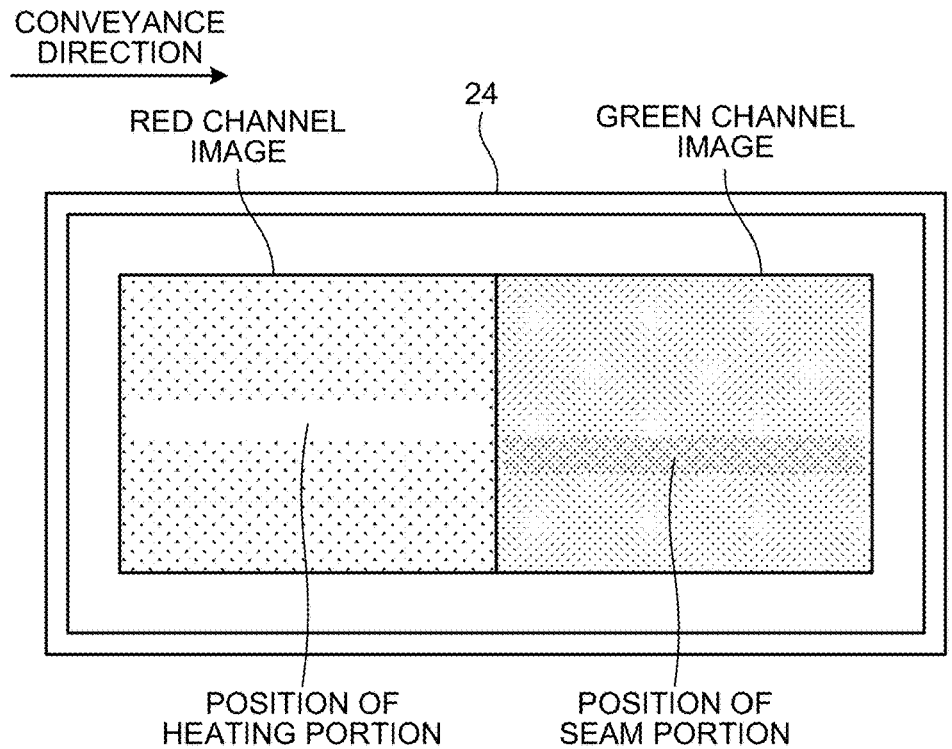

FIG. 11 is a diagram illustrating an example of a method of displaying a detection result by the position detection apparatus for the seam portion and the heating portion of the welded steel pipe according to the embodiment of the present invention.

Figure 12:
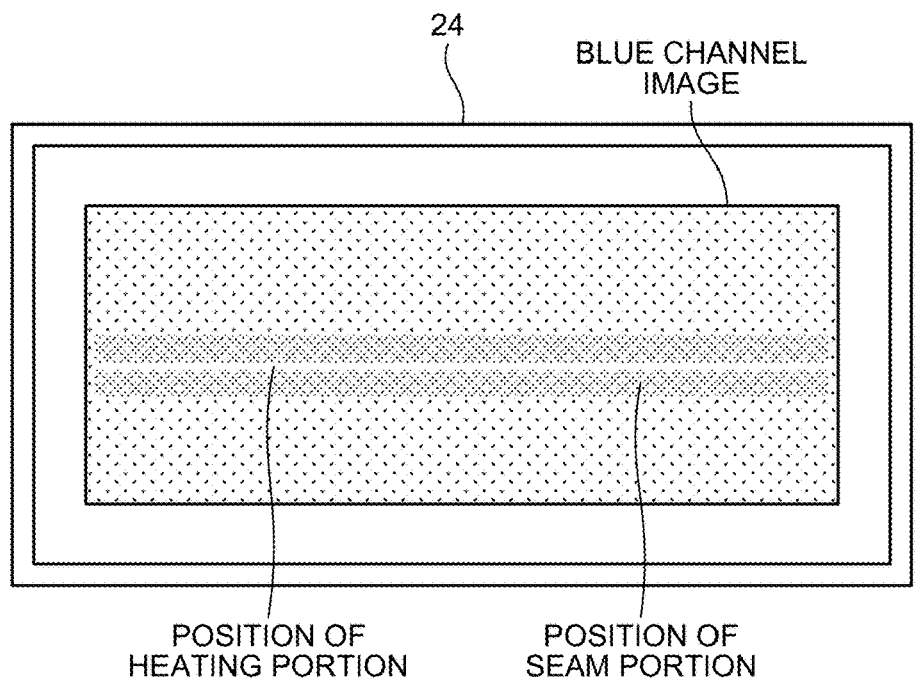

FIG. 12 is a diagram illustrating an example of the method of displaying the detection result by the position detection apparatus for the seam portion and the heating portion of the welded steel pipe according to the embodiment of the present invention.

Figure 13:
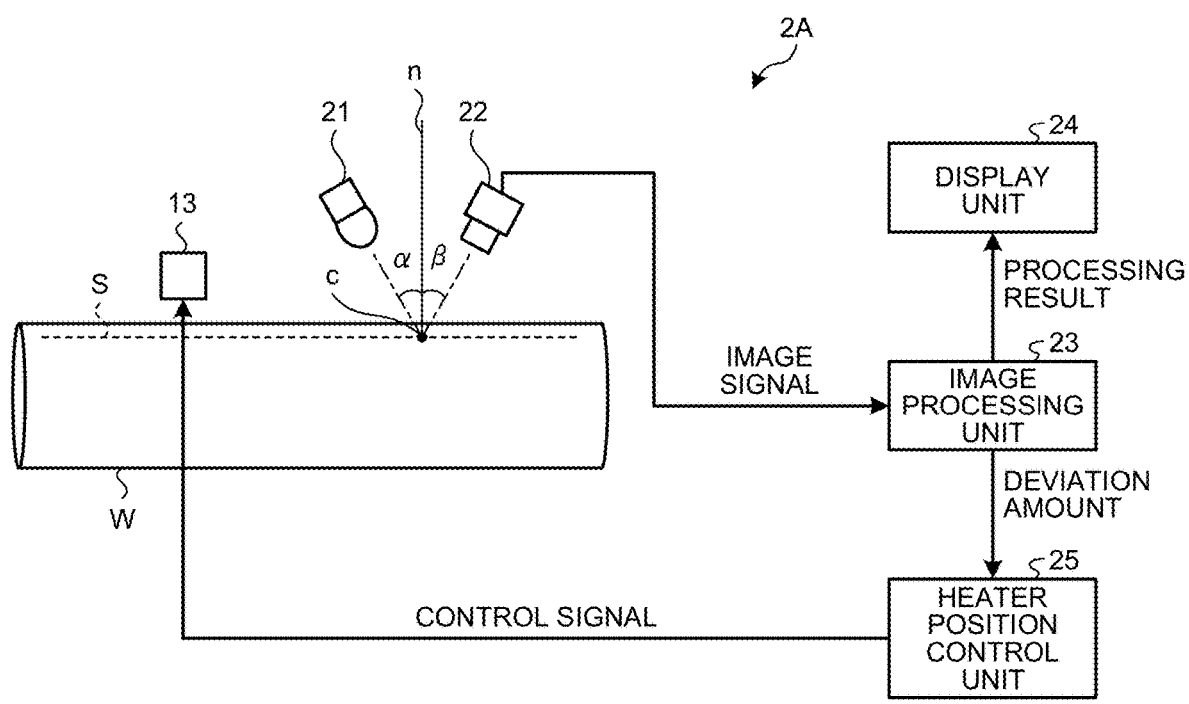

FIG. 13 is a diagram illustrating a configuration of a first modification of the position detection apparatus for the seam portion and the heating portion of the welded steel pipe according to the embodiment of the present invention.

Figure 14:
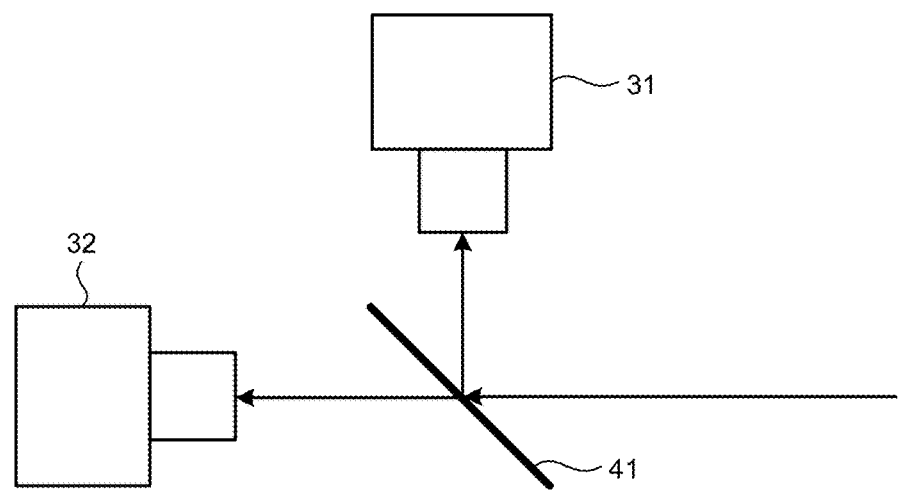

FIG. 14 is a diagram illustrating a configuration of a second modification of the position detection apparatus for the seam portion and the heating portion of the welded steel pipe according to the embodiment of the present invention.

Figure 15:
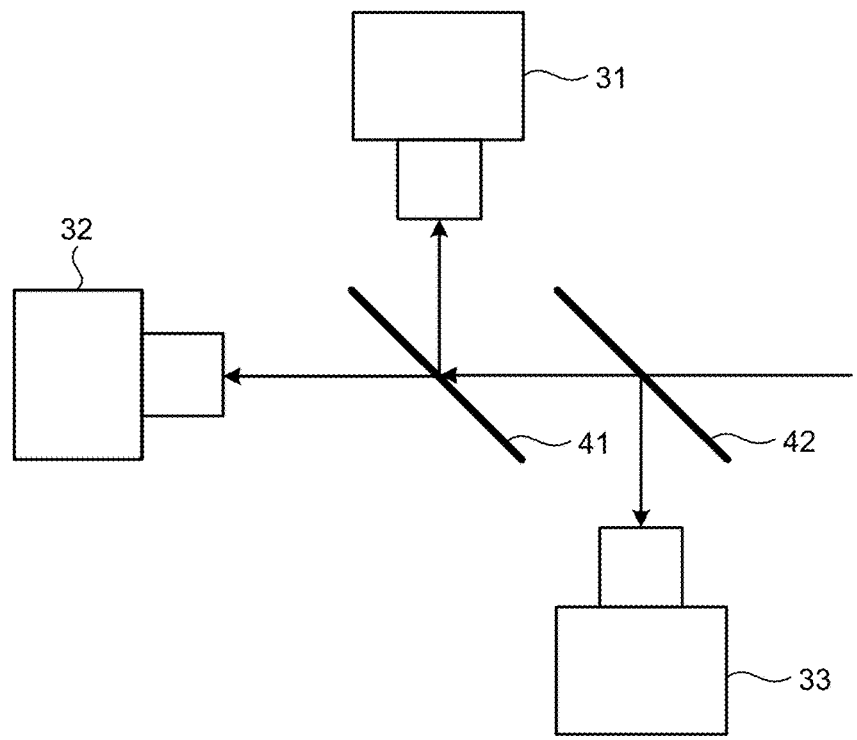

FIG. 15 is a diagram illustrating the configuration of the second modification of the position detection apparatus for the seam portion and the heating portion of the welded steel pipe according to the embodiment of the present invention.

Figure 16:
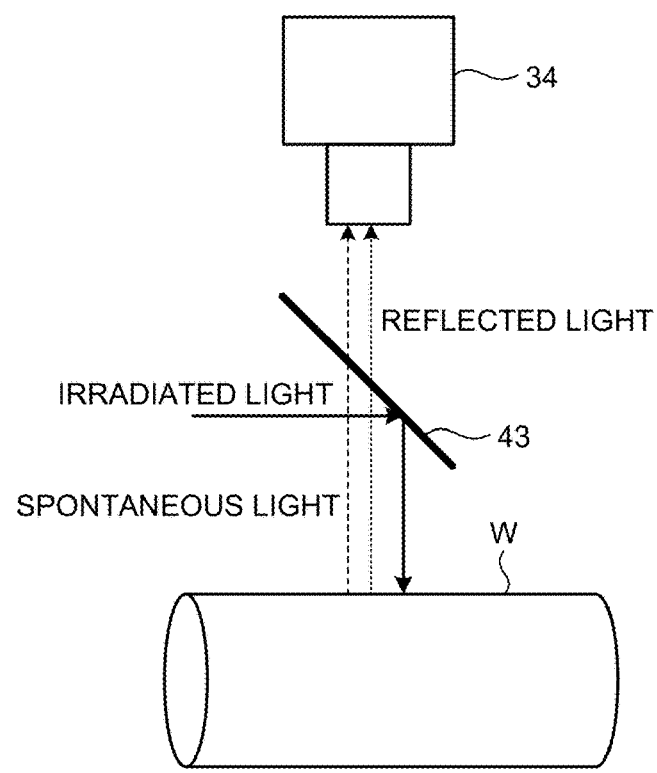

FIG. 16 is a diagram illustrating a configuration of a third modification of the position detection apparatus for the seam portion and the heating portion of the welded steel pipe according to the embodiment of the present invention.

Figure 17:
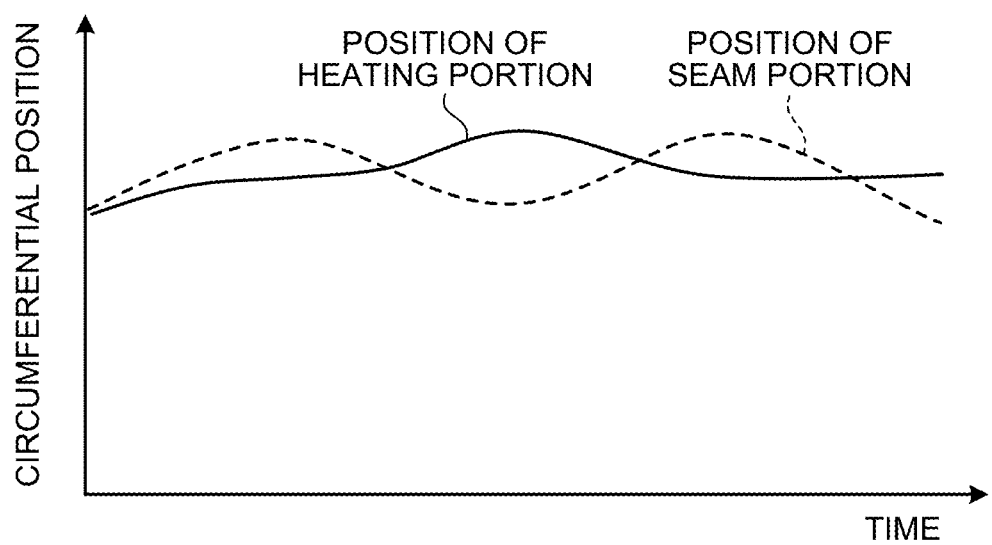

FIG. 17 is an embodiment of the position detection apparatus for the seam portion and the heating portion of the welded steel pipe according to the embodiment of the present invention, and is a graph illustrating the positions of the seam portion and the heating portion detected by the position detection apparatus.

DESCRIPTION OF EMBODIMENTS

A position detection apparatus for a seam portion and a heating portion of a welded steel pipe, a manufacturing equipment for the welded steel pipe, a position detection method for the seam portion and the heating portion of the welded steel pipe, a manufacturing method for the welded steel pipe, and a quality control method for the welded steel pipe according to an embodiment of the present invention will be described with reference to the drawings.
[Manufacturing Equipment and Manufacturing Method for Welded Steel Pipe]

First, a configuration of a manufacturing equipment for a welded steel pipe will be described with reference to FIG. 1. A manufacturing method for the welded steel pipe will also be described. A manufacturing equipment 1 includes a welding apparatus 11, a cutting apparatus 12, and a heating device including a plurality of annealing heaters 13.

The welding apparatus 11 welds a butt portion of a steel plate formed into a cylindrical shape (welding step). The cutting apparatus 12 cuts a bead portion B of a welded steel pipe W formed after welding by the welding apparatus 11 (cutting step). A seam portion S after cutting by the cutting apparatus 12 is aimed and heated by the plurality of annealing heaters 13 (heating step).

Figure 1:
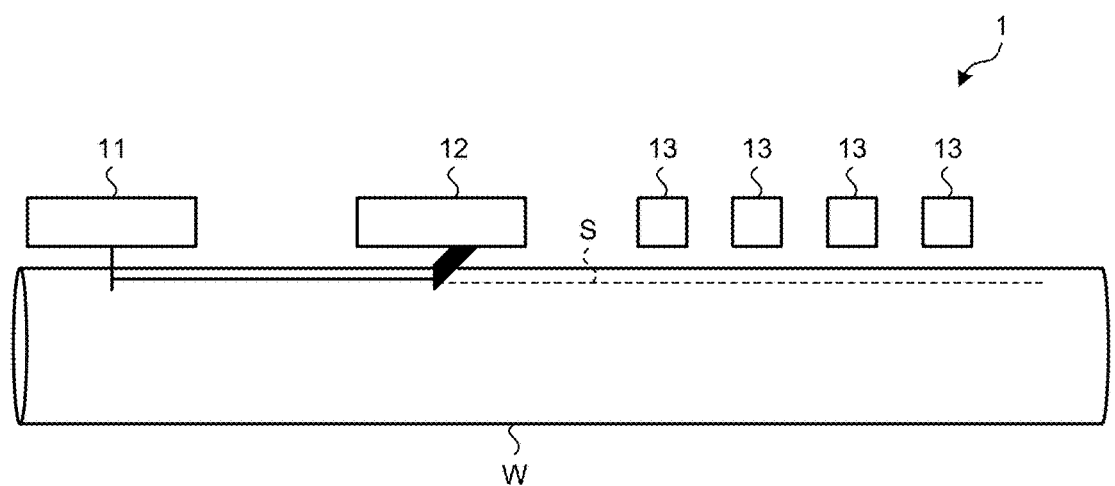
FIG. 1 is a diagram illustrating a schematic configuration of a manufacturing equipment for a welded steel pipe.

Although FIG. 1 illustrates a case in which the plurality of annealing heaters 13 are provided as an example of installation, it is also possible to install only one annealing heater 13. Here, in the present specification, a high-temperature region generated as a result of targeting and heating the seam portion S during or after the heating step is referred to as a heating portion. Since the heating portion has a high temperature, the heating portion emits red heat light or infrared light.

Normally, when the annealing heater 13 is provided at a position matching the seam portion S, the seam portion S and the heating portion coincide with each other. However, in a case where the position of one or the plurality of annealing heaters 13 is shifted, heating is performed in a state of deviating from the seam portion S by the deviation amount. In other words, not only the seam portion S but also the vicinity of the seam portion S are heated together. In addition, when the deviation amount of the annealing heater 13 is large, the annealing heater 13 completely deviates from the seam portion S, and the same heats only the vicinity of the seam portion S. Therefore, it can be said that the heating portion is actually generated by heating the seam portion and/or the vicinity of the seam portion in the heating step.
[Position Detection Apparatus and Position Detection Method]

Figure 2:
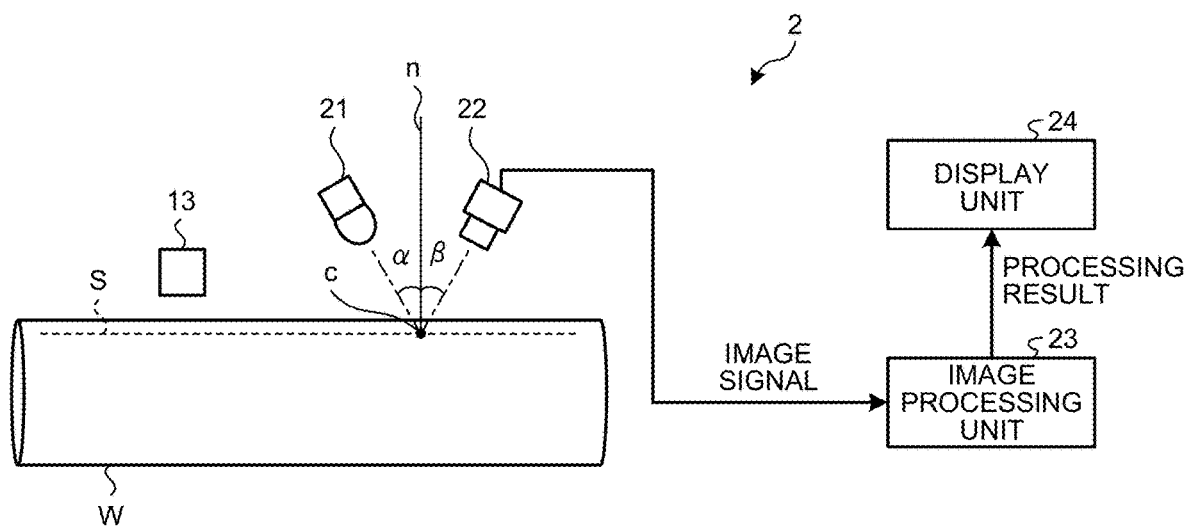
FIG. 2 is a diagram illustrating a configuration of a position detection apparatus for a seam portion and a heating portion of a welded steel pipe according to an embodiment of the present invention.

Next, the position detection apparatus and the position detection method for the seam portion and the heating portion of the welded steel pipe according to the embodiment of the present invention will be described with reference to FIG. 2. A position detection apparatus 2 detects the position of the seam portion S of the welded steel pipe W and the position of the heating portion generated when the seam portion S is aimed and heated by the annealing heater 13 during or after heating by the annealing heater 13 (position detection step). Here, the positions of the seam portion S and the heating portion are both on the surface of the welded steel pipe W. When the position detection apparatus 2 is applied to the manufacturing equipment 1 including the plurality of annealing heaters 13, the position detection apparatus 2 may be installed behind any one of the annealing heaters 13. Furthermore, the position detection apparatus 2 includes a light source 21, an imaging unit 22, an image processing unit 23, and a display unit 24. Further, the position detection apparatus 2 measures the position of the seam portion S and the position of the heating portion on the surface of the welded steel pipe W from the outside of the welded steel pipe W. Since the position detection step is performed during or after heating by the annealing heater 13, the position detection step is performed during the heating step. In other words, the position detection step is included in the heating step.

The light source 21 is disposed outside the welded steel pipe W, and irradiates the seam portion S and the heating portion of the welded steel pipe W with light in a first wavelength range. The first wavelength range is a wavelength range that does not interfere with a second wavelength range to be described later. Usually, the maximum temperature heated by the annealing heater 13 is about 1100° C., and as the first wavelength range, for example, a wavelength range of 550 nm or less is preferable because the same has almost no sensitivity to spontaneous light at 1100° C. and is not affected by the spontaneous light. Particularly, a desirable range is a range of 450 nm to 550 nm, which is generally the wavelength range of a blue channel or a green channel of a color camera. As the light source 21, specifically, a blue light source or a green light source is preferably used.

In addition, an LED light source may be used as the blue light source or the green light source described herein. In addition, a filter and a film configured to allow only blue or green to be transmitted therethrough may be used for a broadband light source such as a metal halide lamp light source, a xenon light source, or a halogen light source. Furthermore, a light source capable of irradiating the corresponding portion by placing an optical element having a property of diffusing a light beam such as a diffusion plate in front of a laser light source having a blue or green wavelength may be used.

The imaging unit 22 is disposed outside the welded steel pipe W, and captures an image of the seam portion S and the heating portion of the welded steel pipe W irradiated with the light by the light source 21. An imaging region to be imaged here does not need to be exactly only the seam portion S and the heating portion, and the imaging region may be a wider region as long as the same includes the seam portion S and the heating portion to be measured. However, if the region is too wide, a region not used for actual measurement increases, and the number of elements of the camera is finite, so that resolution per pixel deteriorates. In addition, if the region is too small, the heating portion and the seam portion S to be measured are out of the visual field due to a fluctuation in the heating portion and the seam portion S and a change in the steel pipe diameter, so that measurement becomes impossible. Therefore, it is preferable to set the imaging range as high-resolution as possible within a range in which the image of each of the heating portion and the seam portion S can be stably captured. The imaging unit 22 has a plurality of different channels, and has at least a first channel and a second channel.

The first channel is a channel capable of receiving reflected light of the first wavelength range emitted by the light source 21. The second channel is a channel capable of receiving reflected light in the second wavelength range corresponding to radiation light generated by red heat of the seam portion S of the welded steel pipe W. Therefore, the second wavelength range is preferably, for example, a wavelength range of 600 nm or more. In particular, the range of 600 nm to 1000 nm is more preferable because the same is within the sensitivity range of an Si element which is usually available at low cost.

As the imaging unit 22, an imaging unit including the above-described first channel capable of receiving the first wavelength range and the above-described second channel capable of receiving the second wavelength range is used. As the imaging unit 22, for example, a color camera having a red channel, a blue channel, and a green channel is preferably used. In this case, the first channel corresponds to the blue channel and the green channel, and the second channel corresponds to the red channel. The heating temperature of annealing in the heating step or the like is, for example, 800 to 1100° C., and the light receiving sensitivity of the blue channel (for example, light in the wavelength band of around 450 nm) with respect to radiation light by red heat is almost zero. On the other hand, the red channel (for example, light in the wavelength band of around 650 nm) has sufficient light receiving sensitivity with respect to radiation light by red heat.

Therefore, the blue light source having a wavelength range in which light receiving sensitivity of the blue channel is obtained is used as the light source 21, and the color camera is used as the imaging unit 22. Then, the seam portion S in the red-heated state in the target welded steel pipe W is irradiated by the light source 21, and the seam portion S and/or the vicinity of the seam portion S irradiated by the light source 21 is imaged by the imaging unit 22. Accordingly, it is possible to cause the red channel to receive only radiation light by red heat and cause the blue channel to receive only reflected light of the blue light source in an optically aligned state.

As described above, by using the optical system for light projection and reception configured to enable visual confirmation of the seam portion S of the welded steel pipe W, it is possible to acquire a reflection image of the seam portion S in a state of being optically aligned with a radiation image of red heat by heating. It is noted that the "reflection image" indicates an image obtained by reflecting the light of the light source 21 with respect to the seam portion S. In addition, the "radiation image" indicates an image by radiation light from the heating portion generated when the seam portion S is aimed and heated.

It is noted that, in order to bring the radiation image and the reflection image into an optically aligned state, it is preferable to acquire the radiation image and the reflection image with a coaxial optical system. Furthermore, by using a general color camera as the imaging unit 22, the cost of the position detection apparatus 2 can be reduced. Additionally, as in the present embodiment, the first channel can have one or a plurality of channels. Similarly, the second channel can also have one or a plurality of channels. In addition, in a case where each of the first channel and the second channel has a plurality of channels, each channel may have sensitivity to a different wavelength range, or may have sensitivity to the same wavelength range.

The imaging unit 22 may have a two-dimensional visual field, or may have a one-dimensional visual field. When the imaging unit 22 has the one-dimensional visual field, it is necessary to have a visual field in the circumferential direction of the welded steel pipe W.

Here, the present embodiment will be described on the assumption that the blue light source is used as the light source 21 and the color camera is used as the imaging unit 22. However, it is needless to say that a combination other than the above configuration can be realized as long as the wavelength range of the radiation light by the red heat and the wavelength range of the light emitted to the target welded steel pipe W can be configured to be separated.

Figure 3:
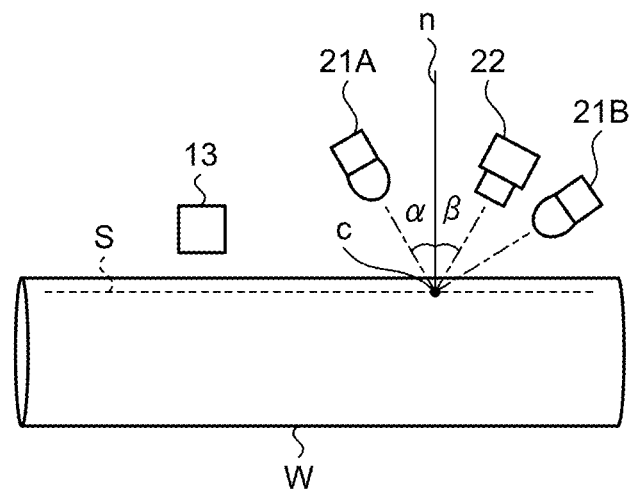
FIG. 3 is a diagram illustrating an example of arrangement of a blue light source and a green light source in the position detection apparatus for the seam portion and the heating portion of the welded steel pipe according to the embodiment of the present invention.

When it is difficult to detect the seam portion S from the reflected light of the welded steel pipe W with only one set of optical systems (the blue light source and the blue channel), for example, two reflection images may be acquired by adding the green light source and the green channel which are a third wavelength range. In this case, for example, as illustrated in FIG. 3, a blue light source 21A and a green light source 21B are disposed in the pipe axial direction of the welded steel pipe W. At the same time, the blue light source 21A can be disposed so as to satisfy a specular reflection condition and the green light source 21B can be disposed so as to satisfy a diffuse reflection condition with respect to the seam portion S and the heating portion.

Figure 4:
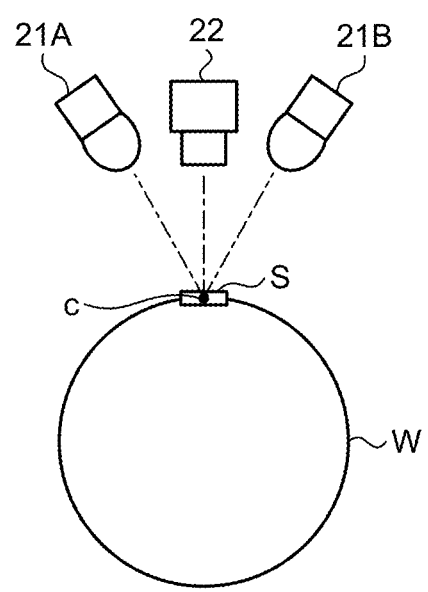
FIG. 4 is a diagram illustrating the example of the arrangement of the blue light source and the green light source in the position detection apparatus for the seam portion and the heating portion of the welded steel pipe according to the embodiment of the present invention.

Alternatively, although not under the specular reflection condition, as illustrated in FIG. 4, the blue light source 21A and the green light source 21B may be disposed at positions symmetrical to each other with respect to the seam portion S in the circumferential direction of the welded steel pipe W, and light may be emitted from two directions. As a result, even if the seam portion S has irregularities, the irradiation directions of the blue light source 21A and the green light source 21B are different from each other, and the directions of shadows are opposite to each other, so that the seam portion S can be accurately detected by image processing. Further, a positional relationship between the blue light source 21A and the green light source 21B in FIGS. 3 and 4 may be interchanged with each other. As described above, two sets of optical systems are used, thereby making it possible to improve detection accuracy of the seam portion S.

(Accuracy and Type of Color Camera)

Next, the accuracy and type of the color camera used as the imaging unit 22 will be described. First, it is necessary to set resolution with respect to required accuracy of alignment between the seam portion S and the heating portion of the welded steel pipe W. For example, if the accuracy of 0.5 mm is required, it is difficult to correctly estimate the position beyond pixel resolution, so that resolution of at least 0.5 mm/pixel or more is required.

Figure 5:
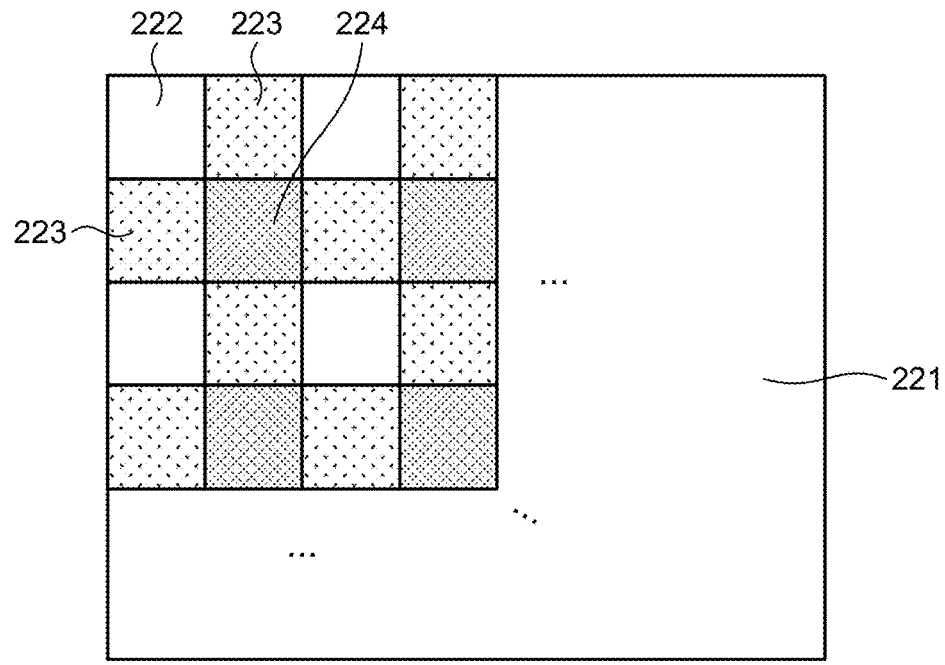
FIG. 5 is a diagram illustrating the principle of a Bayer type color camera.

The type of the color camera mainly includes a Bayer method and a prism method. In the Bayer method, for example, as illustrated in FIG. 5, filters (a red filter 222, a green filter 223, and a blue filter 224) of respective colors are uniformly disposed in front of an imaging device 221 forming each pixel to acquire images. Then, when the images are separated into the images of the respective channels, the pixel values of the respective channels are obtained only for the pixels having the filters of the respective colors, and the other channels are in the state of missing teeth. Therefore, it is possible to generate images for three channels by complementing the pixel values of filters of other colors by the upsampling processing. Although the Bayer method can be realized with a simple configuration, there is no resolution as high as that of an obtained image, and each channel has a characteristic of being shifted in position on an element size order.

Figure 6:
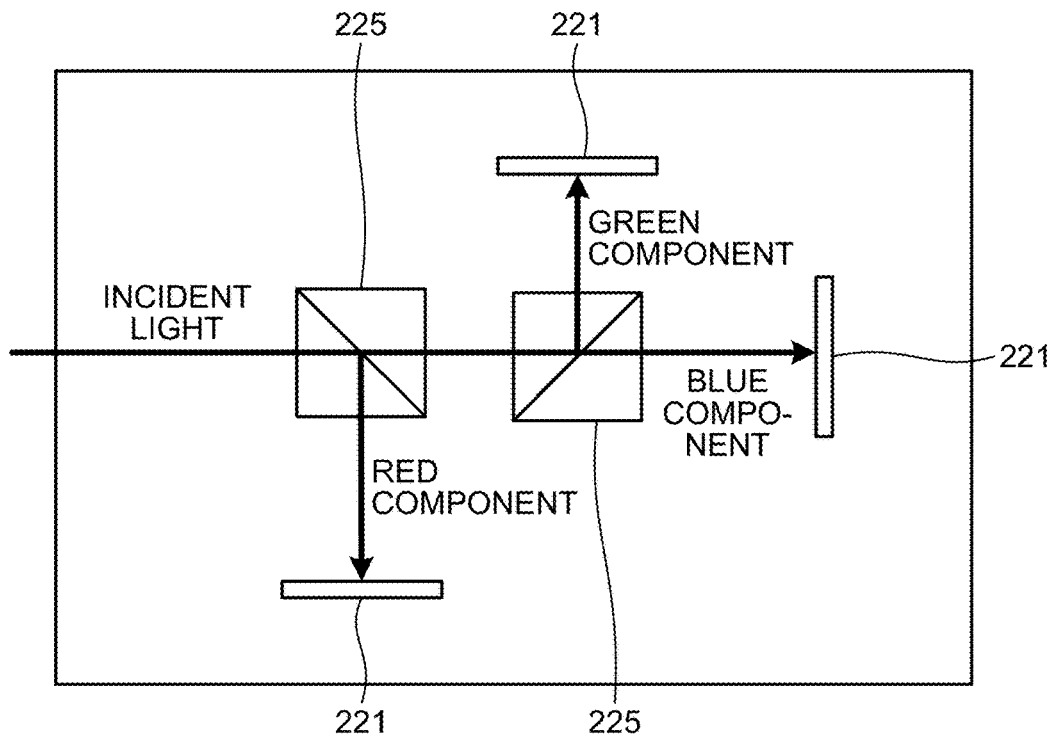
FIG. 6 is a diagram illustrating the principle of a prism type color camera.

On the other hand, in the prism method, as illustrated in FIG. 6, three imaging devices 221 for red, green, and blue are prepared, and colors are separated while the three imaging devices 221 are strictly aligned by a prism 225. The prism 225 having such a function is referred to as a "dichroic prism". The prism method does not require upsampling as in the Bayer method, and position accuracy between respective channels can be obtained with accuracy equal to or less than that of subpixels, and as such, the prism method is characterized in that high measurement accuracy can be obtained as compared with the Bayer method.

(Arrangement of Light Source and Imaging Unit)

Figure 7:
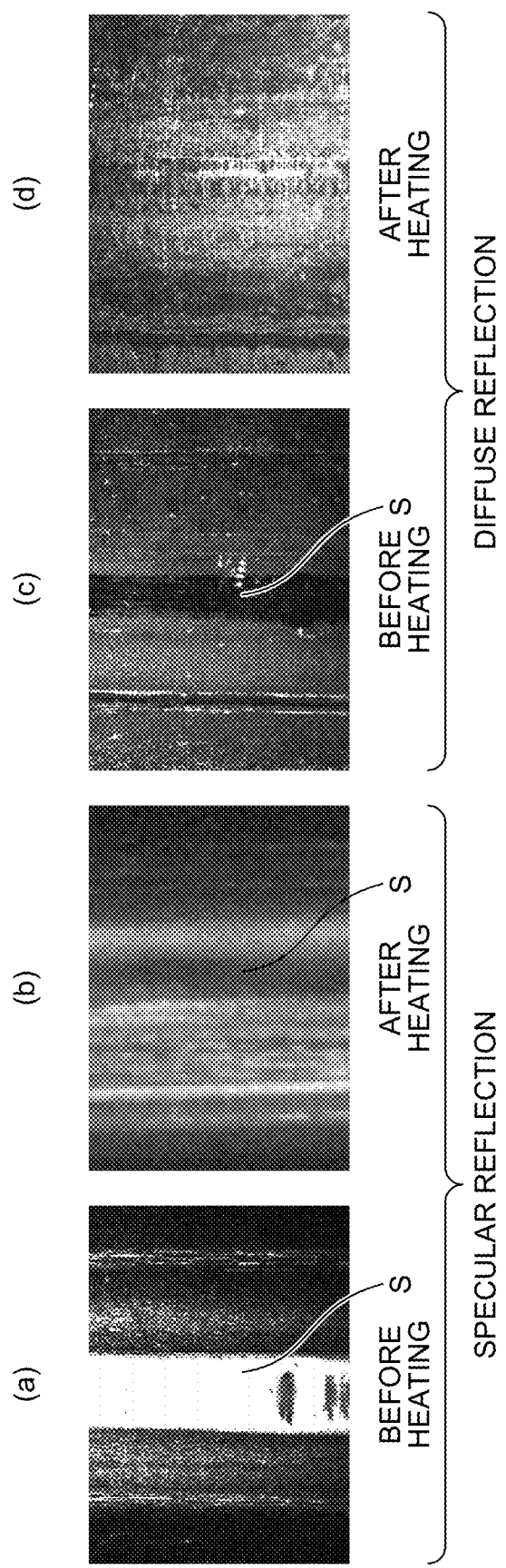
FIG. 7 is a view illustrating an example of a result of imaging a seam portion before and after annealing under a specular reflection condition and a diffuse reflection condition.

Next, a description will be given as to appropriate arrangement positions of the light source 21 and the imaging unit 22 configured to capture an image of the seam portion S of the welded steel pipe W. FIG. 7 is an image of the seam portion S before and after annealing, in which (a) is an image captured under a specular reflection condition before heating, (b) is an image captured under a specular reflection condition after heating, (c) is an image captured under a diffuse reflection condition before heating, and (d) is an image captured under a diffuse reflection condition after heating. In the case of imaging under the specular reflection condition, an image mainly receiving specular reflection light is obtained, and in the case of imaging under the diffuse reflection condition, an image mainly receiving diffuse reflection light, that is, an image obtained by receiving scattered light is obtained.

As described above, the seam portion S immediately after cutting the bead portion B has a very high mirror surface property. When annealing is performed in this state, an oxide film (black skin oxide film) is generated on the surface. Then, as heating is performed, an adhesion amount of the oxide film increases, and the surface roughness increases according to the adhesion amount of the oxide film, and as a result, the mirror surface property of the seam portion S deteriorates and diffusibility increases.

In a case where imaging is performed under the specular reflection condition, in a state where the mirror surface property before heating is high, for example, as illustrated in (a) of FIG. 7, the seam portion S appears brighter than other portions. On the other hand, after heating, since the mirror surface property is lowered due to the adhesion of the oxide film, the diffusibility is increased, and as such, for example, as illustrated in (b) of the same drawing, the seam portion S appears darker than other portions due to the adhesion amount of the oxide film. As described above, in a case where imaging is performed under the specular reflection condition, since there is a large difference in luminance before and after heating, a significant difference also occurs in how the seam portion S appears.

In a case where imaging is performed under the diffuse reflection condition, in a state where the mirror surface property before heating is high, for example, as illustrated in (c) of FIG. 7, the seam portion S appears darker than other portions. On the other hand, after heating, for example, as illustrated in (d) of the same drawing, it becomes difficult to distinguish the seam portion S from other portions. As described above, in the case of imaging under the diffuse reflection condition, there is no significant difference in how the seam portion S appears as compared with the case of imaging under the specular reflection condition.

A relationship between an adhesion amount of an oxide film and specular reflection luminance at the seam portion S and other portions and a relationship between an adhesion amount of an oxide film and diffuse reflection luminance at the seam portion S and other portions are summarized as illustrated in (a) of FIG. 8 and (b) of FIG. 8, respectively.

(a) of FIG. 8 schematically illustrates the relationship between the adhesion amount of the oxide film and the specular reflection luminance. In (a) of FIG. 8, a solid line indicates a change in specular reflection luminance of the seam portion S, a broken line indicates a change in specular reflection luminance of portions other than the seam portion S, a horizontal axis indicates the adhesion amount of the oxide film at the seam portion S, and a vertical axis indicates the specular reflection luminance. On the other hand, (b) of FIG. 8 schematically illustrates the relationship between the adhesion amount of the oxide film and the diffuse reflection luminance. In (b) of FIG. 8, a solid line indicates a change in diffuse reflection luminance of the seam portion S, a broken line indicates a change in diffuse reflection luminance of portions other than the seam portion S, a horizontal axis indicates the adhesion amount of the oxide film in the seam portion S, and a vertical axis indicates the diffuse reflection luminance. Further, in (a) of FIG. 8 and (b) of FIG. 8, the positions of the horizontal axes are roughly aligned so as to be the same position of the horizontal axis with respect to the same adhesion amount. In addition, a vertical alternate long and short dash line indicates a certain time point at which the oxide films of the seam portion S have the same adhesion amount.

In the image under the specular reflection condition, when the oxide film is not much attached to the seam portion S, that is, on the left side of the horizontal axis of (a) of FIG. 8, the seam portion S is brighter than the portions other than the seam portion S. Thereafter, as the adhesion amount of the oxide film increases, the luminance of the seam portion S decreases, and finally, the seam portion S becomes darker than the portions other than the seam portion S. On the other hand, in the image under the diffuse reflection condition, when the oxide film is not much attached to the seam portion S, that is, on the left side of the horizontal axis of (b) of FIG. 8, the seam portion S is darker than the portions other than the seam portion S. Thereafter, as the adhesion amount of the oxide film increases, the luminance of the seam portion S increases, and finally, the seam portion S becomes indistinguishable from the portions other than the seam portion S.

However, depending on the degree of the adhesion amount of the oxide film, the difference between the specular reflection luminance of the seam portion S and the specular reflection luminance of the portions other than the seam portion S becomes small, and as such, it may be difficult to detect the seam portion S from the specular reflection luminance. This is a state indicated by a circle mark (●) in (a) of FIG. 8. In the adhesion amount of the oxide film (illustrated by the alternate long and short dash line) same as that in (a) of FIG. 8 at this time, under the diffuse reflection condition in (b) of FIG. 8, the diffuse reflection luminance of the seam portion S is a circle mark (●), and the diffuse reflection luminance of the portions other than the seam portion S is a cross mark (x). Therefore, there is a high possibility that a difference in diffuse reflection luminance occurs between the circle mark ● and the cross mark x. As described above, even if the difference between the luminance of the seam portion S and the luminance of the portions other than the seam portion S is small in the specular reflection luminance, the seam portion S can be detected from the diffuse reflection luminance as long as the difference between the diffuse reflection luminance of the seam portion S and the diffuse reflection luminance of the portions other than the seam portion S is clearly generated under the diffuse reflection condition. That is, if specular reflection information and diffuse reflection information are combined, the detection of the seam portion S becomes more reliable, thereby obtaining more preferable detection.

FIG. 9 illustrates an example of a flowchart for detecting the position of the seam portion S by combining the specular reflection information and the diffuse reflection information. First, under the specular reflection condition, the seam portion S and portions other than the seam portion S are compared to determine whether there is a difference in specular reflection luminance (step S1). When there is the difference in specular reflection luminance and the seam portion S can be detected (Yes in step S1), the seam portion S is calculated by threshold processing or the like using a luminance difference of a specular reflection image (step S2). On the other hand, when there is no difference in specular reflection luminance and the seam portion S cannot be detected (No in step S1), the seam portion S is calculated using the fact that the seam portion S looks bright or dark with a luminance value of diffuse reflection (step S3). In this way, the seam portion S can be stably detected by the threshold processing or the like without depending on how the oxide film is attached. It is noted that FIG. 9 is an example of a flowchart for stably detecting the seam portion S. However, regardless of the present example, the seam portion S may be directly extracted from the specular reflection image and the diffuse reflection image by using four arithmetic operations, threshold processing, AND processing, OR processing, a combination of these processing, or the like.

Based on the above description, it is preferable to dispose the light source 21 (blue light source in the present embodiment) configured to emit light in the first wavelength range and the imaging unit 22 (color camera in the present embodiment) having the first channel so as to satisfy a specular reflection condition with respect to a measurement point c including the seam portion S. For example, in the case in which the light source 21 and the imaging unit 22 are disposed in the pipe axial direction, it is preferable to install the light source 21 and the imaging unit 22 as illustrated in FIG. 2. In this case, it is preferable that the light source 21 and the imaging unit 22 are respectively installed at positions where an irradiation angle α of light by the light source 21 and a light receiving angle β of light by the imaging unit 22 are equal to each other with respect to a normal vector n of the measurement point c including the seam portion S of the welded steel pipe W. As a result, the seam portion S can be accurately detected before and after annealing. It is noted that it goes without saying that the light source 21 and the imaging unit 22 may be arranged other than the above-described arrangement as long as the seam portion S can be appropriately detected. Hereinafter, the description returns to the configuration of the position detection apparatus 2.

The image processing unit 23 processes an image captured by the imaging unit 22 by a known image processing technique, and respectively detects the position of the seam portion S and the position of the heating portion of the welded steel pipe W (positional relationship between the seam portion S and the heating portion). Furthermore, the image processing unit 23 may detect (calculate) a deviation amount of the position of the heating portion with respect to the position of the seam portion S in addition to the detected positions of the seam portion S and the heating portion. The "deviation amount" described above specifically indicates a deviation amount in the circumferential direction of the welded steel pipe W.

Here, in the image of the heating portion obtained in the red channel of the imaging unit 22, the position of the heating portion is high luminance as in the luminance profile illustrated in FIG. 10. Therefore, the position of the heating portion can be detected by calculating the position at which the luminance becomes high. The position of the heating portion can be detected based on, for example, the position of the center of gravity in the width direction, the position of the highest luminance, the center position after binarization by threshold processing, the position of the center of gravity, and the like.

In addition, the specular reflection image of the welded steel pipe W obtained in the blue channel of the imaging unit 22 looks bright when the adhesion amount of the oxide film on the surface is small (refer to (a) of FIG. 7), and looks dark when the oxide film sufficiently adheres to the surface (refer to (b) of FIG. 7). Therefore, the position of the bright portion and the position of the dark portion are calculated by the same idea as in the case of the red channel.

When the longitudinal direction or the lateral direction of the image does not exactly coincide with the conveyance direction of the welded steel pipe W, it is preferable to perform preprocessing such as rotating the image. In addition, it is preferable to reduce noise by performing preprocessing such as removing a high frequency component by a frequency filter or the like, or calculating integration, averaging, and median processing in the pipe axial direction of the welded steel pipe W.

In addition, in a case where it is difficult to accurately calculate the seam portion S even by the image processing by the image processing unit 23 and the seam portion S can be determined by visually observing the image, for example, the image of the heating portion and the image of the seam portion S may be visually displayed to an operator through the display unit 24.

The display unit 24 provides guidance to the operator by displaying a processing result by the image processing unit 23. The display unit 24 can display, for example, a deviation amount of the position of the heating portion with respect to the position of the seam portion S of the welded steel pipe W detected by the image processing unit 23 as a numerical value. In addition, the display unit 24 may display each of the position of the seam portion S and the position of the heating portion as an image.

In a case where each of the position of the seam portion S and the position of the heating portion is displayed as an image, for example, an image received through the blue channel of the imaging unit 22 and an image received through the red channel may be displayed in an overlapping manner. Alternatively, as illustrated in FIG. 11, an image indicating the position of the seam portion S and an image indicating the position of the heating portion may be displayed side by side in the conveyance direction of the welded steel pipe W. In addition, in a case where the automatic detection of the seam portion S cannot be performed with high accuracy, for example, as illustrated in FIG. 12, the position of the heating portion estimated from the position of the annealing heater 13 may be superimposed and displayed on the seam portion S. As described above, by displaying each of the position of the seam portion S and the position of the heating portion as an image, the operator can intuitively grasp the position of the seam portion S and the position of the heating portion.

It is noted that the position detection apparatus 2 may include a notification unit configured to give a notification by an alarm when there is a distance equal to or longer than a predetermined threshold between the position of the seam portion S and the position of the heating portion. In addition, the position detection apparatus 2 may include a recording unit configured to accumulate images processed by the image processing unit 23 and to record transition of a heating situation.

First Modification

In the position detection apparatus 2 described above, the position detection results of the seam portion S and the heating portion of the welded steel pipe W are displayed on the display unit 24. On the other hand, for example, as illustrated in FIG. 13, the position of the annealing heater 13 may be controlled based on the deviation amount of the positions of the seam portion S and the heating portion detected by the image processing unit 23. A position detection apparatus 2A illustrated in the same drawing includes a heater position control unit 25 in addition to the configuration of the position detection apparatus 2 illustrated in FIG. 2.

The heater position control unit 25 controls the position of the annealing heater 13 based on the deviation amount of the position of the heating portion with respect to the position of the seam portion S detected by the image processing unit 23 of the position detection apparatus 2A. That is, the heater position control unit 25 moves the position of the annealing heater 13 in the circumferential direction of the welded steel pipe W so that the heating portion coincides with the seam portion S. As described above, by controlling the position of the annealing heater 13 based on the deviation amount of the position of the heating portion with respect to the position of the seam portion S, the seam portion S can be accurately heated.

In addition, when the plurality of annealing heaters 13 are provided, the position of the annealing heater 13 in front of and/or behind the position detection apparatus 2A according to the present invention can be controlled. In a case where the position of the annealing heater 13 in front of the position detection apparatus 2A is controlled, feedback is performed, and heating step can be stably controlled. On the other hand, in a case where the position of the annealing heater 13 behind the position detection apparatus 2A is controlled, feedforward is performed, control is performed with better reaction, and the seam portion S heated by deviation is also correctly heated behind the position detection apparatus 2A. More preferably, the position of the annealing heater 13 in front of and behind the position detection apparatus 2A is controlled, thereby making it possible to obtain both the feedback and feedforward advantages. Most preferably, the positions of all the annealing heaters 13 in front of and behind the position detection apparatus 2A are controlled, thereby making it possible to more reliably obtain the effects intended in the heating step.

In addition, when the welded steel pipe W is twisted in the heating processing and the position of the seam portion S is different for each position of each of the annealing heaters 13, it is preferable to install the plurality of position detection apparatuses 2A in front of and behind each of the annealing heaters 13. With this arrangement, it is possible to grasp the positional relationship between the heating portion and the seam portion S for each of the annealing heaters 13, thereby improving position control performance even if a twist occurs on the welded steel pipe W. Although it is preferable to install more position detection apparatuses 2A, it is most preferable to grasp the positional relationship between the heating portion and the seam portion S in front of and behind all the annealing heaters 13, and as such, it is possible to completely exclude the influence of twisting.

Second Modification

A second modification of the present invention will be described. In the second modification, as illustrated in FIG. 14, two cameras 31 and 32 having the same optical characteristics and a beam splitter 41 are used instead of the color camera. A prism may be used instead of the beam splitter 41. Then, optical axis alignment is performed on the two cameras 31 and 32 using the beam splitter 41, and target visual fields are adjusted to be the same.

The optical characteristics described herein refer to a visual field and resolution. In front of each of the cameras 31 and 32, for example, a filter configured to allow only the first wavelength range to be transmitted therethrough and a filter configured to allow only the second wavelength range to be transmitted therethrough are installed. As a result, it is possible to obtain a reflection image and a radiation image in the aligned state, and it is possible to obtain an effect similar to that in the case of using the color camera. Furthermore, at this time, even if a slight positional shift occurs due to deviation of the optical axis or shading of the lens, for example, in a case where correspondence between elements is known in advance so that imaging targets are located at the same position between images, alignment may be performed by image processing. In addition, instead of the beam splitter 41 and the prism, a dichroic mirror having a characteristic of controlling the reflection direction or transmitting light according to a wavelength range may be used.

Furthermore, for example, in a case where a reflection image under two conditions is captured using three cameras 31, 32, and 33, as illustrated in FIG. 15, optical axis alignment is performed using two beam splitters 41 and 42, thereby making it possible to obtain an effect similar to that in the case of using the color camera.

Third Modification

A third modification of the present invention will be described. In the third modification, as illustrated in FIG. 16, a color camera 34 and a half mirror 43 are used. For example, in a case where there is almost no space between the annealing heaters 13 due to arrangement restriction, it is difficult to perform irradiation under a specular reflection condition and a diffuse reflection condition as in the embodiment described later.

Therefore, in such a case, a coaxial epi-illumination optical system as illustrated in FIG. 16 may be adopted. That is, the surface of the welded steel pipe W is irradiated with a light beam in the first wavelength range via the half mirror 43, and a reflected light is transmitted to the half mirror 43 and received by the color camera 34. In addition, since light in the second wavelength range can be received via the half mirror 43, it is possible to coaxially receive the reflected light and receive and emit spontaneous light, and space saving can be expected.

[Quality Control Method]

A quality control method for the welded steel pipe W controls the quality of the welded steel pipe W based on the deviation amount of the position of the heating portion with respect to the position of the seam portion S detected by the position detection apparatuses 2 and 2A. In the quality control method, for example, when the deviation amount is greater than or equal to a predetermined threshold, an inspection step of inspecting whether the quality of the welded steel pipe W (for example, toughness or the like) satisfies predetermined required specifications is performed. Then, based on the result of the inspection step, it is determined whether the welded steel pipe W is reused as a graded product or discarded as an NG product. As described above, the welded steel pipes W are classified based on the deviation amount of the position of the heating portion with respect to the position of the seam portion S, thereby making it possible to provide the welded steel pipe W having excellent quality.

According to the position detection apparatus for the seam portion and the heating portion of the welded steel pipe, the manufacturing equipment for the welded steel pipe, the position detection method for the seam portion and the heating portion of the welded steel pipe, the manufacturing method for the welded steel pipe, and the quality control method for the welded steel pipe according to the embodiment described above, the following effects are obtained. That is, the welded steel pipe W is imaged by the imaging unit 22 having the channel configured to receive the reflected light of the light emitted from the light source 21 to the seam portion S and the channel configured to receive the radiation light by the red heat of the heating portion, thereby making it possible to obtain a low-cost and simple configuration. In addition, the positions of the seam portion and the heating portion can be accurately detected.

Further, according to the position detection apparatus for the seam portion and the heating portion of the welded steel pipe, the manufacturing equipment for the welded steel pipe, the position detection method for the seam portion and the heating portion of the welded steel pipe, the manufacturing method for the welded steel pipe, and the quality control method for the welded steel pipe according to the embodiment described above, the following effects are also obtained. That is, it is possible to visualize and automate measures for preventing positional deviation of the positional relationship between the seam portion S and the heating portion, which has been conventionally dependent on visual observation of an actual object by an operator.

Hereinabove, the position detection apparatus for the seam portion and the heating portion of the welded steel pipe, the manufacturing equipment for the welded steel pipe, the position detection method for the seam portion and the heating portion of the welded steel pipe, the manufacturing method for the welded steel pipe, and the quality control method for the welded steel pipe according to the present invention have been specifically described by the forms and embodiments for implementing the present invention. However, the gist of the present invention is not limited to these descriptions, and should be broadly interpreted based on the description of the claims. It goes without saying that various changes, modifications, and the like based on these descriptions are also included in the gist of the present invention.

Embodiment

An embodiment of the present invention will be described. In the present embodiment, a position detection apparatus similar to that of FIG. 2 was constructed, and the positions of a seam portion and a heating portion was detected by the position detection apparatus. A color camera of 640×480 pixels was used as an imaging unit, and a spot light source capable of emitting only blue light was used as a light source. In addition, the arrangement of the imaging unit and the light source was set to a specular reflection condition, and a light irradiation angle was set to five degrees. FIG. 17 illustrates a result of calculating the positions of the seam portion and the heating portion from an obtained image by center-of-gravity processing. As illustrated in the drawing, it can be seen that the heating portion can accurately follow the seam portion.

In the present embodiment, a Bayer type color camera is used as the imaging unit, but a prism type color camera may be used. Furthermore, in the present embodiment, imaging is performed under the specular reflection condition, but imaging may be performed under a diffuse reflection condition as long as a difference between the seam portion and portions other than the seam portion can be detected as a characteristic of the image, or imaging may be performed using the optical system illustrated in FIGS. 3 and 4.

REFERENCE SIGNS LIST

1 MANUFACTURING EQUIPMENT
11 WELDING APPARATUS
12 CUTTING APPARATUS
13 ANNEALING HEATER
2, 2A POSITION DETECTION APPARATUS
21 LIGHT SOURCE
21A BLUE LIGHT SOURCE
21B GREEN LIGHT SOURCE
22 IMAGING UNIT
221 IMAGING DEVICE
222 RED FILTER
223 GREEN FILTER
224 BLUE FILTER
225 PRISM
23 IMAGE PROCESSING UNIT
24 DISPLAY UNIT
25 HEATER POSITION CONTROL UNIT
31, 32, 33 CAMERA
34 COLOR CAMERA
41, 42 BEAM SPLITTER
43 HALF MIRROR
S SEAM PORTION
W WELDED STEEL PIPE
n NORMAL VECTOR
α IRRADIATION ANGLE
β LIGHT RECEIVING ANGLE
c MEASUREMENT POINT

The invention claimed is:

1. A position detection apparatus for a seam portion and a heating portion of a welded steel pipe, the position detection apparatus detecting a position of the seam portion of the welded steel pipe and a position of the heating portion generated by heating the seam portion and/or a vicinity of the seam portion, the position detection apparatus comprising:
   a light source configured to irradiate the seam portion and the heating portion with light in a first wavelength range;
   an imaging unit having a plurality of different channels and configured to capture a reflection image of the seam portion and a radiation image of the heating portion irradiated with the light by the light source; and
   an image processing unit configured to process the reflection image and the radiation image captured by the imaging unit and to detect the position of each of the seam portion and the heating portion,
   wherein the imaging unit includes:
   a first channel capable of receiving the light in the first wavelength range; and a second channel capable of receiving light in a second wavelength range corresponding to radiation light from the heating portion, the reflection image of the seam portion and the radiation image of the heating portion are in a state of being coaxially optically aligned when captured by the imaging unit, and the reflection image of the seam portion and the radiation image of the heating portion are separated according to the first channel and the second channel, respectively.

2. The position detection apparatus for the seam portion and the heating portion of the welded steel pipe according to claim 1, wherein the light source and the imaging unit having the first channel are disposed at positions satisfying a specular reflection condition with respect to a measurement point including the seam portion.

3. A manufacturing equipment for a welded steel pipe, the manufacturing equipment comprising:
   a welding apparatus configured to weld a butt portion of a steel plate formed into a cylindrical shape;
   a cutting apparatus configured to cut a bead portion after welding;
   one or a plurality of annealing heaters configured to heat a seam portion after cutting; and
   the position detection apparatus for the seam portion and the heating portion of the welded steel pipe according to claim 1, the position detection apparatus being provided behind any one of the annealing heaters,
   wherein the position detection apparatus detects a position of the seam portion and a position of the heating portion generated by the annealing heater.

4. A manufacturing equipment for a welded steel pipe, the manufacturing equipment comprising:
   a welding apparatus configured to weld a butt portion of a steel plate formed into a cylindrical shape;
   a cutting apparatus configured to cut a bead portion after welding;
   one or a plurality of annealing heaters configured to heat a seam portion after cutting; and
   the position detection apparatus for the seam portion and the heating portion of the welded steel pipe according to claim 2, the position detection apparatus being provided behind any one of the annealing heaters,
   wherein the position detection apparatus detects a position of the seam portion and a position of the heating portion generated by the annealing heater.

5. A position detection method for a seam portion and a heating portion of a welded steel pipe, the position detection method detecting a position of the seam portion of the welded steel pipe and a position of the heating portion generated by heating the seam portion and/or a vicinity of the seam portion, the method comprising:
   irradiating the seam portion and the heating portion with light from a light source in a first wavelength range;
   capturing, by an imaging unit having a plurality of different channels, a reflection image of the seam portion and a radiation image of the heating portion irradiated with the light; and
   processing the captured reflection image and the captured radiation image and detecting the position of each of the seam portion and the heating portion, wherein the imaging unit includes:
   a first channel capable of receiving the light in the first wavelength range; and
   a second channel capable of receiving light in a second wavelength range corresponding to radiation light from the heating portion,
   the reflection image of the seam portion and the radiation image of the heating portion are in a state of being coaxially optically aligned when captured by the imaging unit, and
   the reflection image of the seam portion and the radiation image of the heating portion are separated according to the first channel and the second channel, respectively.

6. A manufacturing method for a welded steel pipe, the manufacturing method comprising:
   welding a butt portion of a steel plate formed into a cylindrical shape;
   cutting a bead portion after welding; and
   heating a seam portion after cutting with an annealing heater,
   wherein heating the seam portion includes detecting a position of the seam portion and a position of a heating portion generated by the annealing heater, by the position detection method for the seam portion and the heating portion of the welded steel pipe according to claim 5.

7. The manufacturing method for the welded steel pipe according to claim 6, wherein heating the seam portion includes controlling a position of the annealing heater based on a deviation amount of the detected position of the heating portion with respect to the detected position of the seam portion.

8. A quality control method for a welded steel pipe, the quality control method controlling quality of the welded steel pipe based on a deviation amount of the position of the heating portion with respect to the position of the seam portion, the deviation amount being detected by the position detection method for the seam portion and the heating portion of the welded steel pipe according to claim 5.

9. The position detection apparatus for the seam portion and the heating portion of the welded steel pipe according to claim 1, wherein
   the light source is a blue light source or a green light source, the imaging unit is a color camera having a red channel, a blue channel, and a green channel, the first channel corresponds to the blue channel and the green channel, and the second channel corresponds to the red channel.

10. The position detection method for the seam portion and the heating portion of the welded steel pipe according to claim 5, wherein
   the light source is a blue light source or a green light source, the imaging unit is a color camera having a red channel, a blue channel, and a green channel, the first channel corresponds to the blue channel and the green channel, and the second channel corresponds to the red channel.

* * * * *